(12) United States Patent
Iwamoto

(10) Patent No.: US 7,432,684 B2
(45) Date of Patent: Oct. 7, 2008

(54) MOBILE EQUIPMENT WITH ELECTRIC POWER SUPPLY CONTROL FUNCTION

(75) Inventor: Shigeru Iwamoto, Saitama (JP)

(73) Assignee: Hoya Corporation, Tokyo (JP)

( * ) Notice: Subject to any disclaimer, the term of this patent is extended or adjusted under 35 U.S.C. 154(b) by 270 days.

(21) Appl. No.: 11/152,230

(22) Filed: Jun. 15, 2005

(65) Prior Publication Data

US 2005/0280397 A1 Dec. 22, 2005

(30) Foreign Application Priority Data

Jun. 16, 2004 (JP) .......................... P2004-177990

(51) Int. Cl.
*H01M 6/50* (2006.01)
*H02J 7/00* (2006.01)
*G03B 7/26* (2006.01)
*G03B 17/08* (2006.01)

(52) U.S. Cl. ..................................... 320/100
(58) Field of Classification Search ................ 320/103, 320/100, 130; 396/29, 279
See application file for complete search history.

(56) References Cited

U.S. PATENT DOCUMENTS 5,424,800 A * 6/1995 Suzuki ........................ 396/279
5,717,308 A * 2/1998 Nishitani et al. ............ 396/279

FOREIGN PATENT DOCUMENTS

| JP | 9-43673 | 2/1997 |
| JP | 2003-215690 | 7/2003 |

OTHER PUBLICATIONS

English Language Abstract of JP 9-43673.
English Language Abstract of JP 2003-215690.

* cited by examiner

*Primary Examiner*—Gary L Laxton
*Assistant Examiner*—Yalkew Fantu
(74) *Attorney, Agent, or Firm*—Greenblum & Bernstein, P.L.C.

(57) ABSTRACT

An apparatus for controlling the supply of electric power to mobile equipment has a battery checker that checks a remaining battery-level of at least one of plural batteries including main battery. The main battery is installed in a body, and the other batteries are installed in an auxiliary electric power source accessory that is detachably mounted on the body. The apparatus further has a battery-level indicator that indicates a mark so as to represent a remaining battery-level based on a plurality of grades and indicates a common mark in each grade, and a battery selector that selectively uses one of the plural batteries. When the remaining battery-level shifts over a boundary battery-level positioned between grades adjacent to each other, the battery selector selects one of the plural batteries, the remaining battery-level of which is greatest.

9 Claims, 11 Drawing Sheets

<A GRADE>

<B GRADE>

<C GRADE>

<D GRADE>

MOBILE EQUIPMENT WITH ELECTRIC POWER SUPPLY CONTROL FUNCTION

BACKGROUND OF THE INVENTION

1. Field of the Invention

The present invention relates to mobile equipment with a battery, such as a camera, PDA, and so on. Especially, it relates to an electric power control in accordance with a remaining battery level.

2. Description of the Related Art

In an SLR type camera, an auxiliary battery, a so called "battery grip", is detachably mounted on a camera body. A main battery in the camera body or the auxiliary battery is selectively utilized, thus the number of captures increases remarkably, and the battery life can be extended. A remaining battery-level is displayed based on two or three grades on an LCD on the camera, and a symbol mark is displayed in accordance with a grade, in which the remaining battery-level is included. The displayed remaining battery-level corresponds to the battery that is current, namely, a remaining battery-level that the user can confirm is a battery-level associated with one of the main battery and the auxiliary battery.

SUMMARY OF THE INVENTION

An object of the present invention is to provide a camera or mobile equipment with at least two batteries that is capable of displaying a total remaining battery-level by selectively using one of the batteries.

A camera system according to the present invention has a camera body, and an auxiliary electric power source accessory detachably mounted on the camera body. A first battery is installed in the camera body, whereas a second battery is installed in the auxiliary electric power source accessory. The camera system also has a battery checker, a battery-level indicator, and a battery selector. The battery checker checks the remaining battery-level of at least one of the first and second batteries. The battery-level indicator indicates a mark so as to represent a remaining battery-level based on a plurality of grades. For example, the battery-level indicator indicates the remaining battery-level based on 4 grades. Then, the battery-level indicator indicates a common mark in each grade. The battery selector selectively uses one of the first and second batteries. When the remaining battery-level shifts over a boundary battery-level positioned between grades adjacent to each other, the battery selector selects one of the first and second batteries, the remaining battery-level of which is greater than that of the other battery.

As the battery having more voltage is usually selected, the indicator mark corresponding to the next grade is not displayed unless both voltages shift over the boundary voltage. Consequently, the user confirms the total remaining battery-level by viewing the displayed indicator mark.

The camera system may have an electric power source situation detector that detects whether the electric power supply situation has changed, for example, if the accessory is mounted on the camera while the main electric power source of the camera is tuned ON. In this case, the battery checker may check the remaining battery-level of the first and second batteries when the electric power supply situation changes.

To efficiently check the remaining battery-level, the battery checker may check only the battery being used, so long as the remaining battery-level does not shift over the boundary battery-level. The battery checker checks the first and second batteries when the remaining battery-level shifts over the boundary battery-level.

An apparatus for controlling the supply of electric power to mobile equipment according to another aspect of the present invention has a battery checker that checks the remaining battery-level of at least one of plural batteries including a main battery. The first battery is installed in a body, and the other battery is installed in an auxiliary electric power source accessory that is detachably mounted on the body. The apparatus further has a battery-level indicator that indicates a mark so as to represent a remaining battery-level based on a plurality of grades, and indicates a common mark in each grade, and a battery selector that selectively uses one of the plural batteries. When the remaining battery-level shifts over a boundary battery-level positioned between grades adjacent to each other, the battery selector selects one of the plural batteries, the remaining battery-level of which is greatest.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiments of the present invention are described with reference to the attached drawings.

Figure 1:
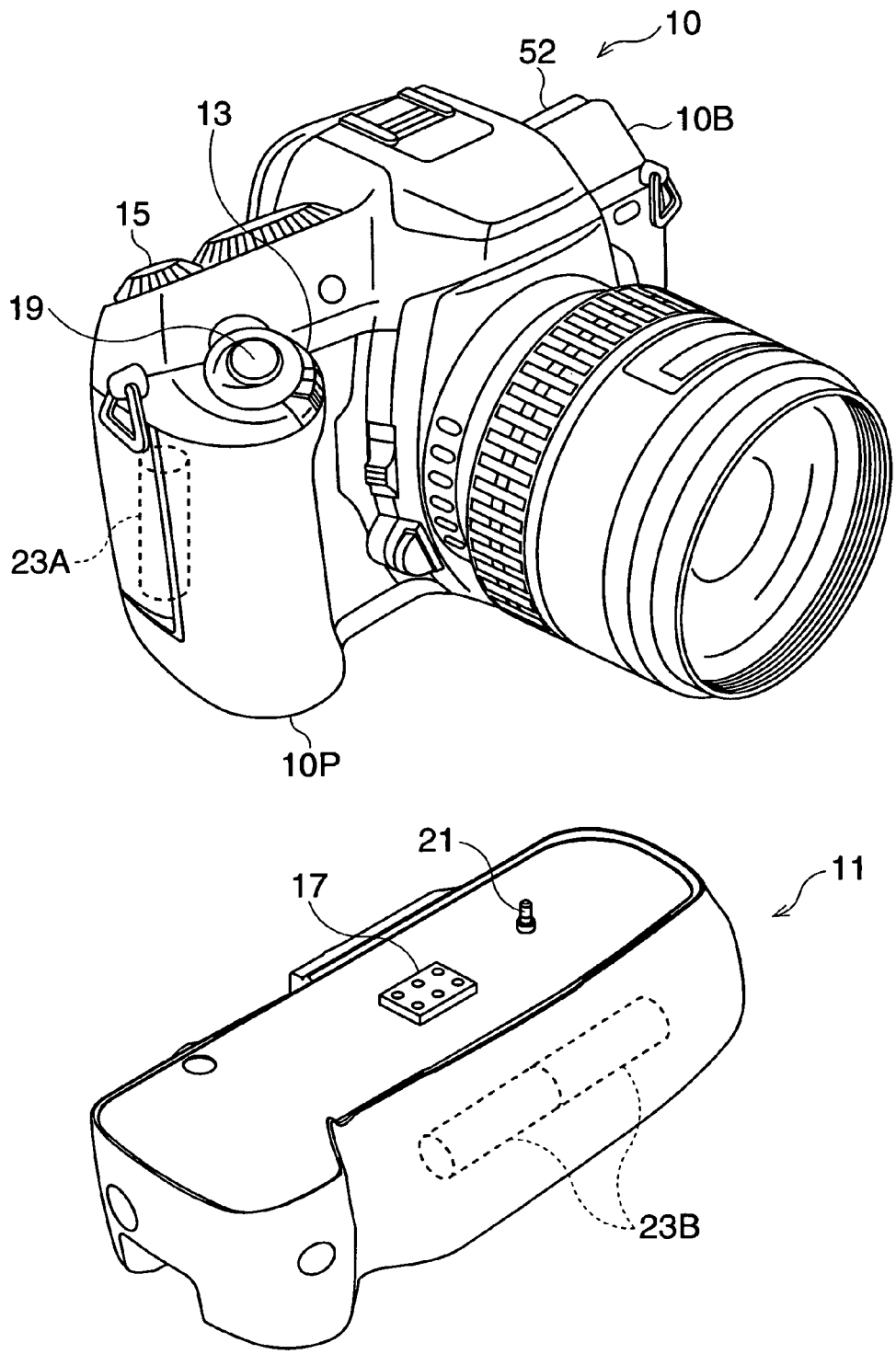
FIG. 1 is a schematic view of a digital camera according to a present embodiment.
Figure 2:
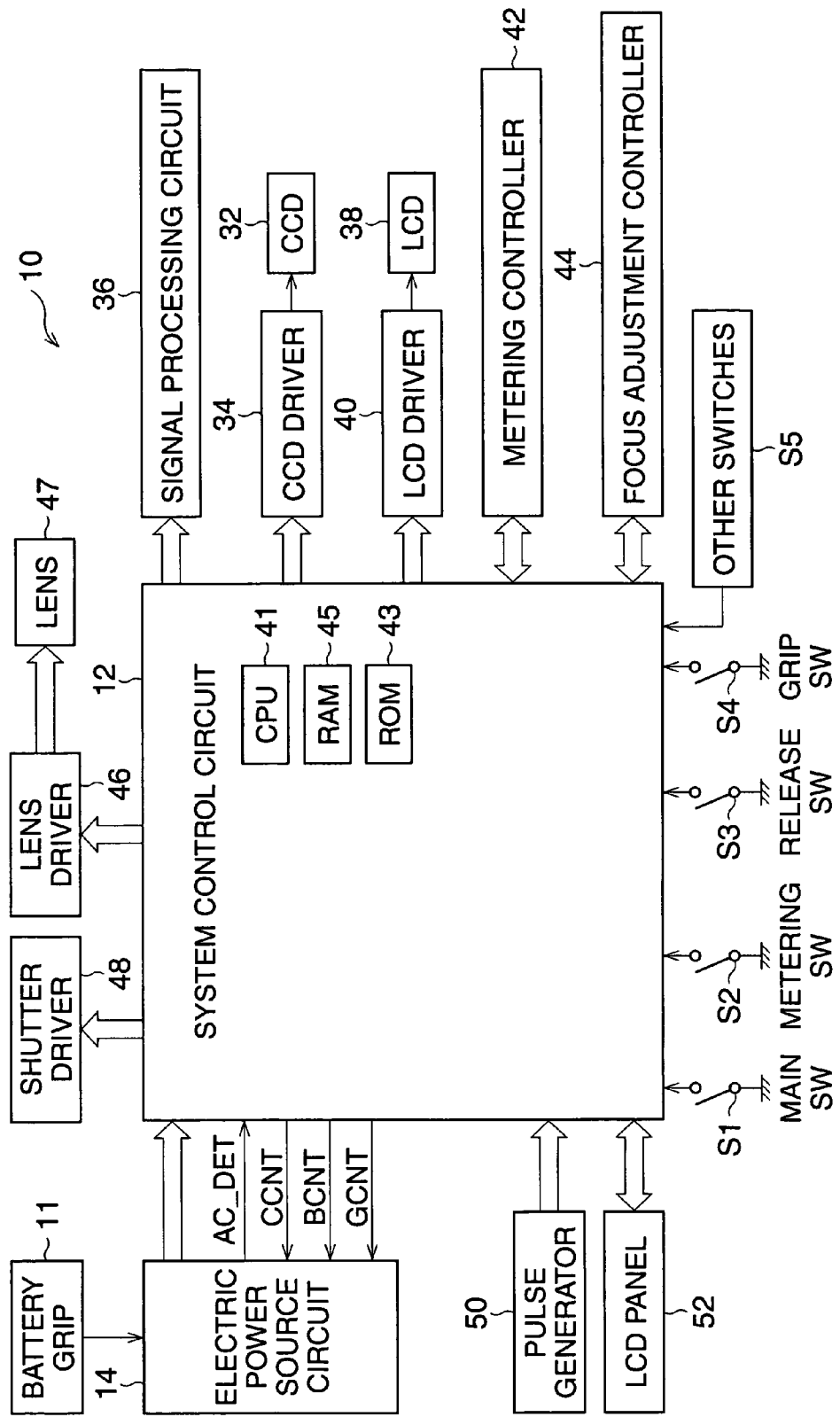
FIG. 2 is a block diagram of the digital camera.

FIG. 1 is a schematic view of a digital camera according to the present embodiment. FIG. 2 is a block diagram of the digital camera.

The digital camera 10 is an SLR type digital still camera capable of recording and displaying images. A battery grip 11 is detachably mounted on a bottom surface 10P of the camera 10 as an auxiliary electric power source. A battery 23A is installed in a battery chamber (not shown) formed in the camera body 10B, while a battery 23B is installed in a battery chamber (not shown) formed in the battery grip 11.

When an electric power dial 13 is operated by the user, a main switch S1 shown in FIG. 2 is turned ON, and electric power is supplied from an electric power source circuit 14 to each circuit shown in FIG. 2. The remaining battery-level or exposure values, and so on, are displayed on an LCD 52. When mounting the battery grip 11 on the camera body 10B, a connecting terminal 17 is contacted with the camera body 10B, and the battery grip 11 is fixed to the camera body 10B by an urge member (not shown). Further, a grip switch S4 is tuned ON by the connection of a pin 21, thus the installment of the battery grip 11 is detected.

When a release button 19 is depressed halfway, a metering switch S2 is turned ON. Thus, a brightness of a subject is detected by a metering controller 42, and exposure values such as a shutter speed and F number are calculated. When the release button 19 is depressed fully and a release switch S3 is turned ON, a shutter (not shown) opens and closes based on a shutter driver 48. A subject image is formed on a CCD 32 by light passing through a lens 47, so that image-pixel signals corresponding to the subject image are read from the CCD 32.

The image-pixel signals are subjected to various processes in a signal processing circuit 34, and compressed image data is recorded in a memory card (not shown). When a playback mode is selected by operating a mode dial 15 provided on the camera body 10B, the photographed image is displayed on an LCD 38 on the back surface of the camera 10.

A system control circuit 12 controls the camera 10, and has a CPU 41, a ROM 43, and a RAM 45. a program for controlling a photograph motion and electric power supply is stored in the ROM 43 in advance. Various data generated by a given process is temporarily stored in the RAM45. The system control circuit 12 outputs control signals to a CCD driver 34, a LCD driver 40, the metering controller 42, a focus adjustment controller 44, lens driver 46, a pulse generator 50, and so on. The LCD 52 is driven by another LCD driver (not shown in FIG. 2). The literal information or character information displayed on the LCD panel 52 is changed by a situation of other switches S4.

Figure 3:
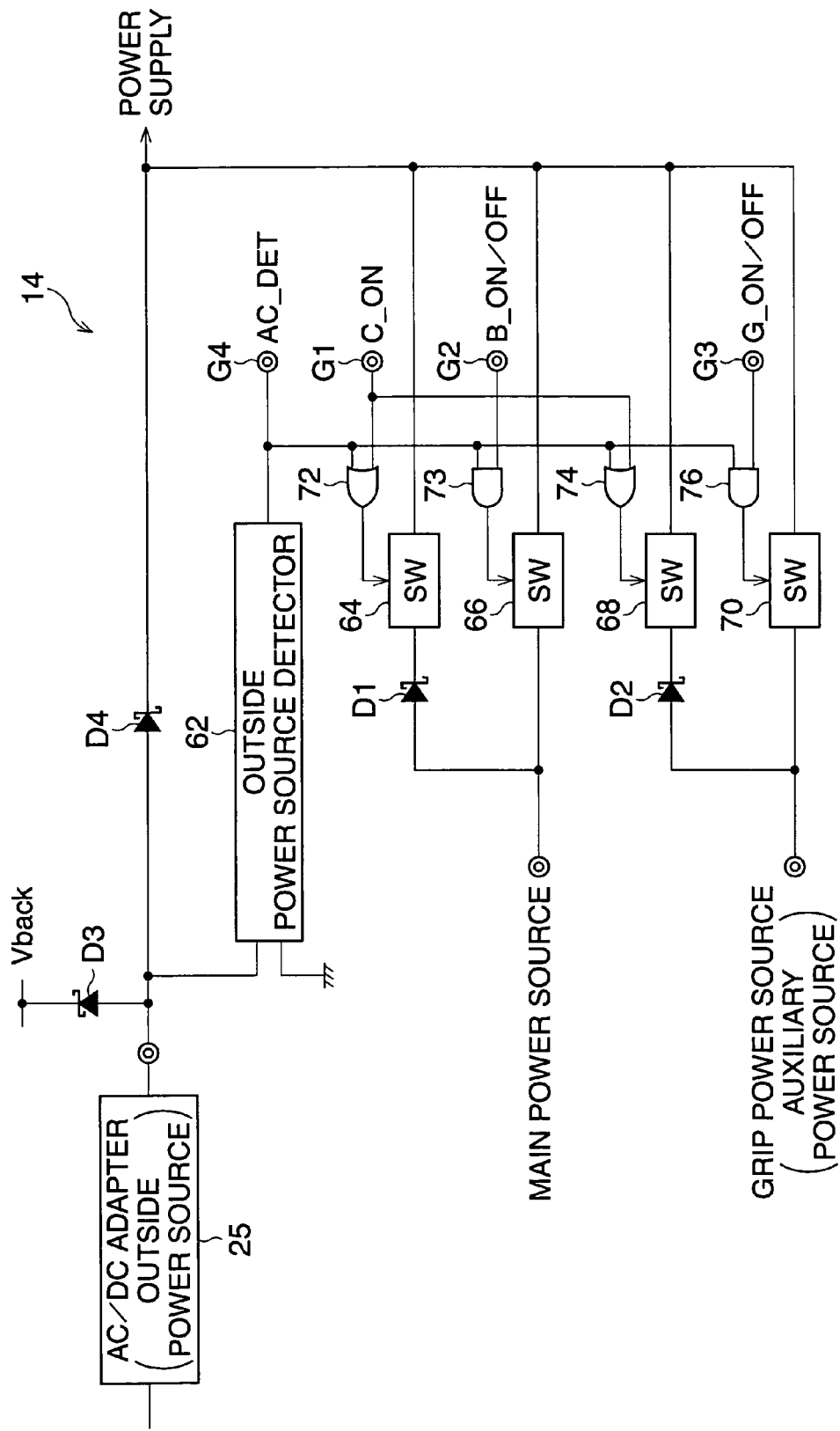
FIG. 3 is a view showing an electric power source circuit 14.

FIG. 3 is a view showing an electric power source circuit 14.

As for the electric power supply, the battery 23A in the camera body 10B, the battery 23B in the battery grip 11, or outside commercial electric power source is available to supply electric power to the camera. The electric power source circuit 14 selects one from the above three electric power sources, and supplies the electric power.

The electric power source circuit 14 has four switches 64, 66, 68, 70, diodes D1 to D4, an outside power source detector 62, AND circuits 73, 76, and OR circuits 72, 74. The OR circuits 72, 74 respectively output a High/Low level signal in accordance with an input signal sent from the system control circuit 12 to a terminal G1. The AND circuit 73 outputs a High/Low level signal in accordance with an input signal of a terminal G2, while the AND circuit 76 outputs a High/Low level signal in accordance with an input signal of a terminal G3.

When the power is supplied by the battery 23A in the camera body 10B, the system control circuit 12 outputs control signals to the terminals G1, G2 respectively so as to make the OR circuits 72, 74 output exchange signals for turning ON the switches 64, 68, and so as to make the AND circuit 73 output an exchange signal for turning ON the switch 66. On the other hand, the system control circuit 12 outputs a control signal to the terminal G3 so as to make the AND circuit 76 output a signal for maintaining the switch OFF.

When the power is supplied by the auxiliary battery 23B in the battery grip 11, the system control circuit 12 outputs control signals to the terminals G1, G3 so as to make the OR circuits 72, 74 output exchange signals for turning ON the switches 64, 68, and make the AND circuit 76 output an exchange signal for turning ON the switch 70. On the other hand, the system control circuit 12 outputs a control signal to the terminal G2 so as to make the AND circuit 73 output an exchange signal for maintaining the switch 66 OFF.

The outside power source detector 62 detects whether the AC/DC adapter 25 is connected to the camera 10, namely, whether the commercial electric power source is used. When the AC/DC adapter 25 is connected to the camera 10, a detecting signal is output to the system control circuit 12 via a terminal G4. The system control circuit 12 outputs control signals to the terminals G2, G3 so as to make the AND circuits 73, 76 exchange output signals for turning the switches 66, 70 OFF. Note, the terminal G1 is maintained in the ON situation to allow the battery grip 11 to be detached and mounted.

With reference to FIGS. 4 to 11, power source controlling process and a remaining battery level indicating process are explained.

Figure 4:
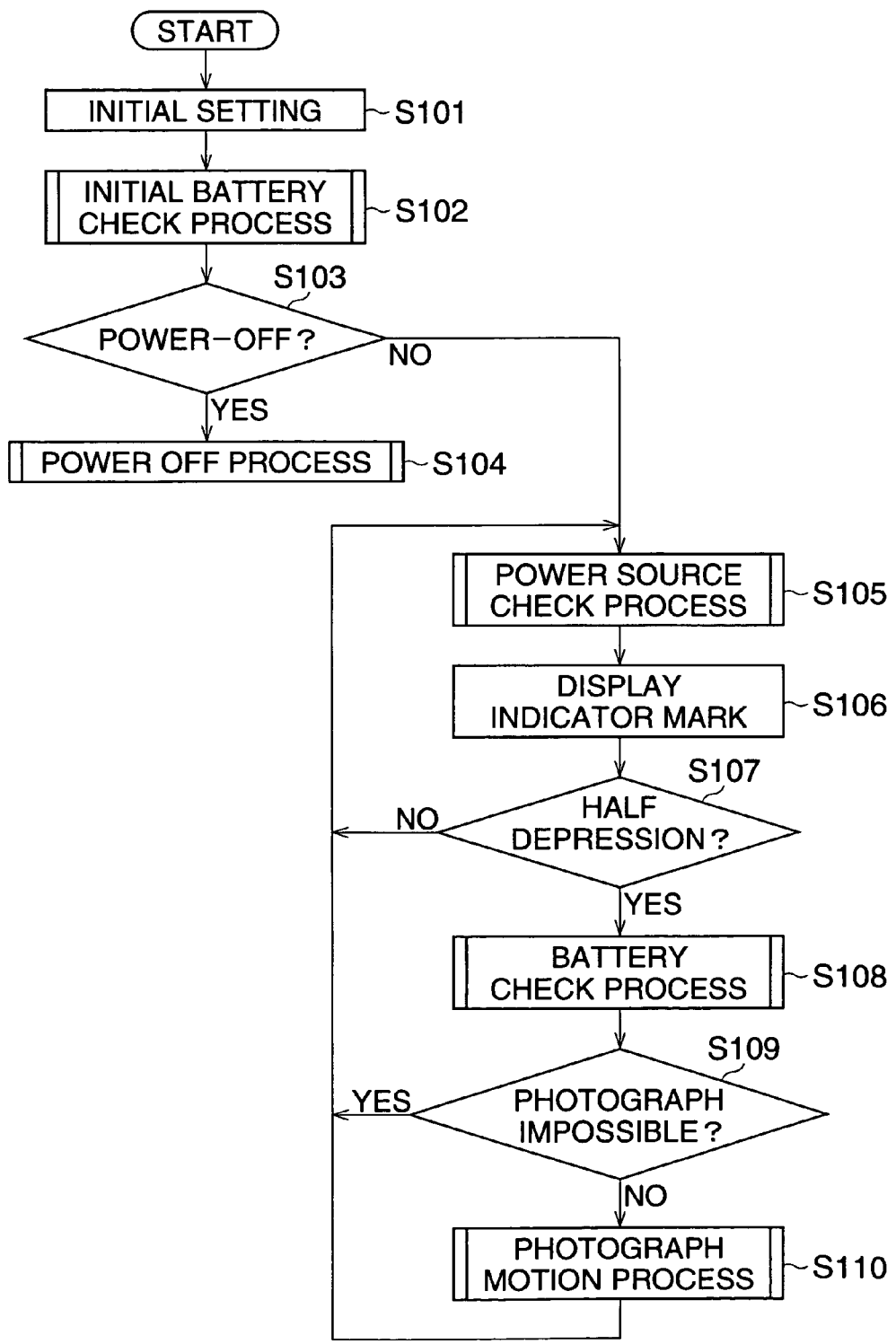
FIG. 4 is a view showing a flowchart of a photograph motion process.

FIG. 4 is a view showing a flowchart of a photograph motion process performed by the system control circuit 12. The process starts when the electric power source is turned ON.

In Step S101, the initial setting process, such as a register initial setting, data reading process in the RAM 43, and so on, is performed. In Step S102, an initial battery check process is performed.

Figure 5:
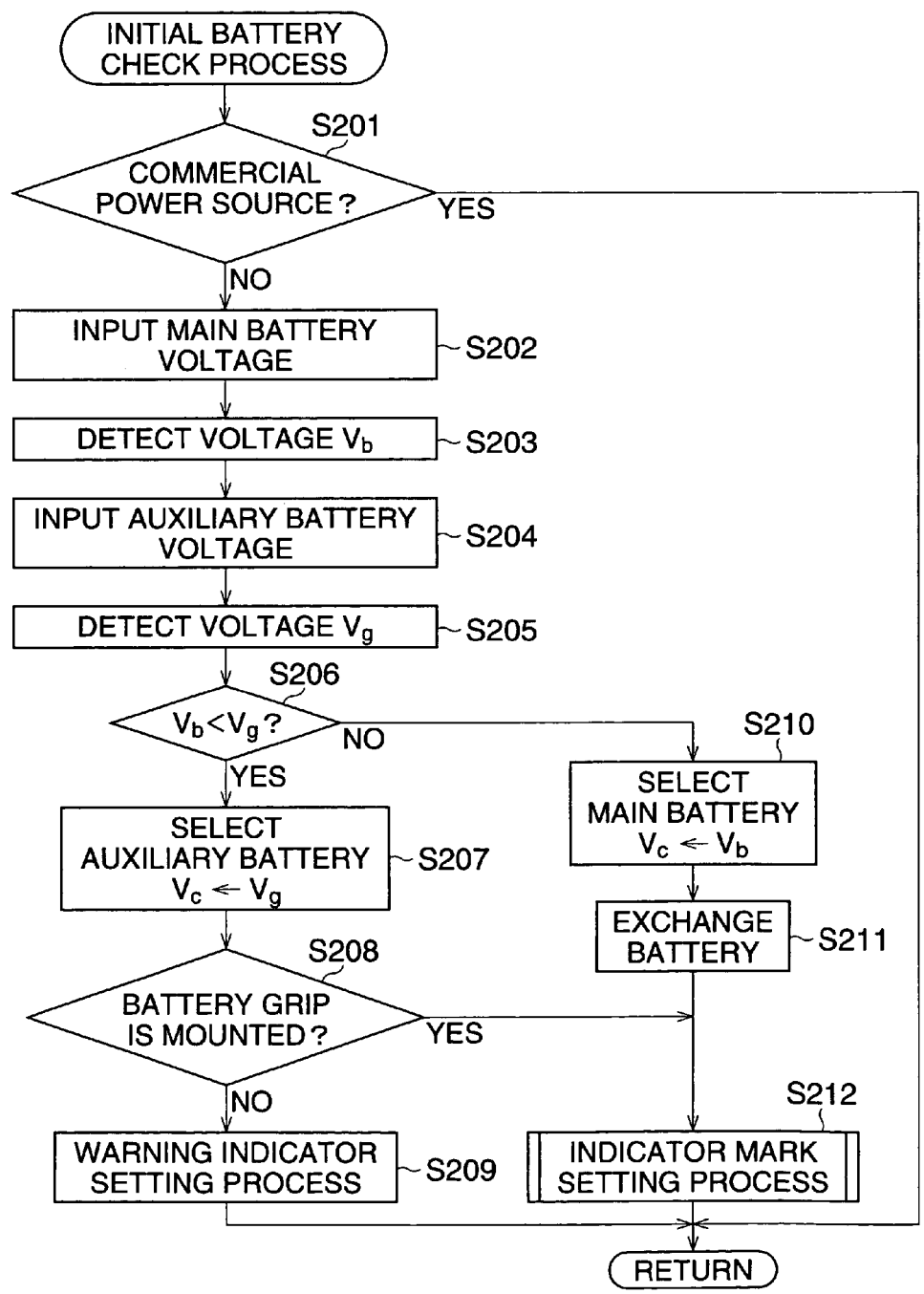
FIG. 5 is a view showing a subroutine of Step S102 in FIG. 4.

FIG. 5 is a view showing a subroutine of Step S102 in FIG. 4, or the initial battery check process in FIG. 4.

In Step S201, it is determined whether the outside commercial power source is supplied to the camera 10 via the AC/DC adapter 25. When it is determined that an outside commercial power source is supplied to the camera 10, control signals are output from the system control circuit 12 to the electric power source circuit 14 so as not to use the batteries 23A and 23B. On the other hand, when it is determined that an outside commercial power source is not supplied to the camera 10, the process goes to Step S202.

In Step S202, to perform the battery-check process for the battery 23A in the camera 10, a control signal is fed from the system control circuit 12 to the electric power source circuit 14 such that the electric power (voltage) according to the battery 23A is input to the electric power source circuit 14. In Step S203, a voltage "$V_b$" of the battery 23A is detected to check the remaining battery-level.

In Step S204, to perform the battery-check process for the battery 23B in the battery grip 11, a control signal is fed from the system control circuit 12 to the electric power source circuit 14 such that the electric power (voltage) according to the battery 23B is input to the electric power source circuit 14. In Step S205, a voltage "$V_g$" of the battery 23B is detected to check the remaining battery level. In Step S206, it is determined whether the voltage "$V_b$" of the battery 23A is smaller than the voltage "$V_g$" of the battery 23B in order to compare the remaining battery-level of the battery 23A with the remaining battery-level of the battery 23B. In this embodiment, one battery, the remaining battery-level of which is more than that of the other battery, is selected and used.

When it is determined that the voltage "$V_b$" of the battery 23A is smaller than the voltage "$V_g$" of the battery 23B in Step S206, the process goes to Step S207, wherein it is decided that the electric power is supplied to the camera 10 by using the battery 23B in the battery grip 11, and a remaining battery voltage "$V_C$" is set to the voltage "$V_g$". The remaining battery voltage "$V_C$" indicates a voltage of the remaining battery-level of the used battery. The remaining battery-level is determined in accordance with the remaining battery voltage "$V_C$". After Step S207 is performed, the process goes to Step S208.

In Step S208, it is determined whether the battery grip 11 is mounted on the camera 10. When it is determined that the battery grip 11 is not mounted to the camera 10, the process goes to Step S209, wherein a warning display process is performed as described later. On the other hand, when it is determined that the battery grip 11 is mounted to the camera 10, the process goes to. Step S212.

On the other hand, when it is determined that the voltage "$V_b$" of the battery 23A is not smaller than the voltage "$V_g$" of the battery 23B in Step S206, the process goes to Step S210. In Step S210, it is decided that the electric power is supplied to the camera 10 by using the battery 23A in the camera body 10B, and the remaining battery voltage "$V_C$" is set to the voltage "$V_b$".

In Step S211, since the voltage "$V_g$" is input to the electric power source circuit 14 by the performance of Step S205, a control signal is output from the system control circuit 12 to the electric power source circuit 14 so as to supply the electric power by using the battery 23A. After Step S211 is performed, the process goes to Step S212, wherein an indicator mark setting process for indicating the remaining battery-level by a mark is performed.

Figure 6:
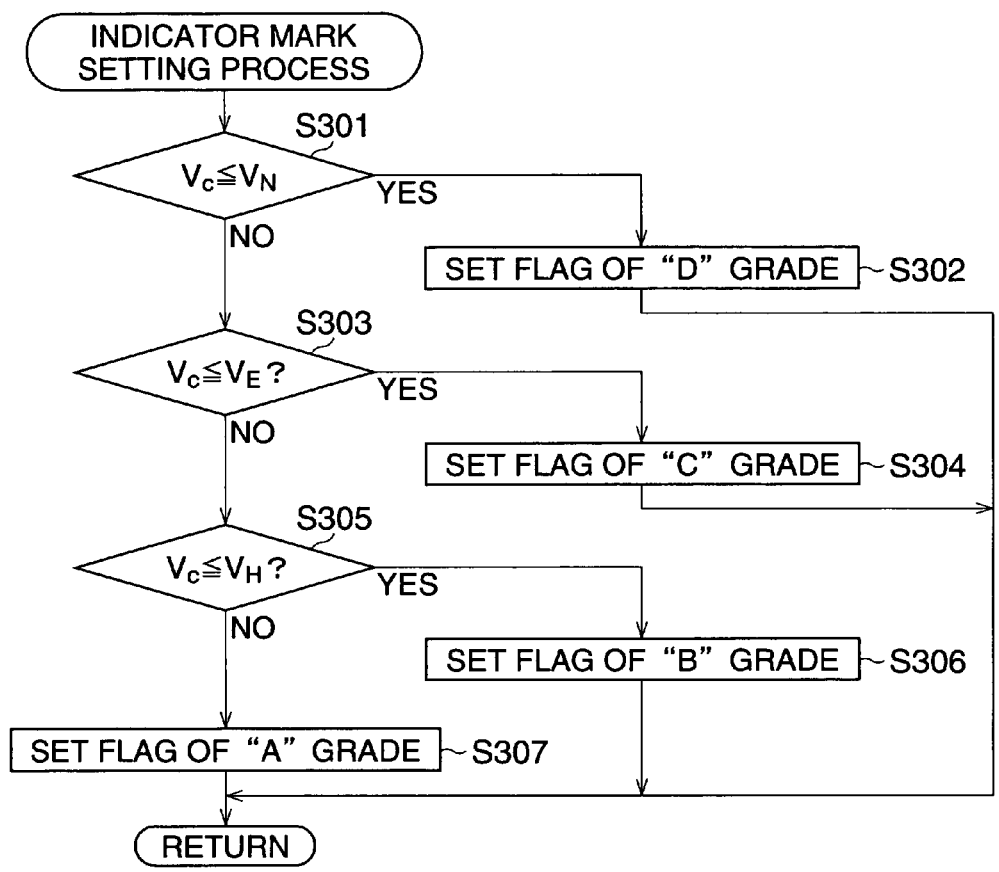
FIG. 6 is a view showing a subroutine of Step S212 in FIG. 5.
Figure 7A:
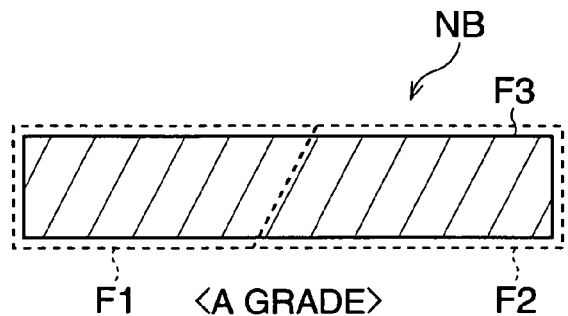
FIGS. 7A to 7D are views showing an indicator mark corresponding to each grade.
Figure 7B:
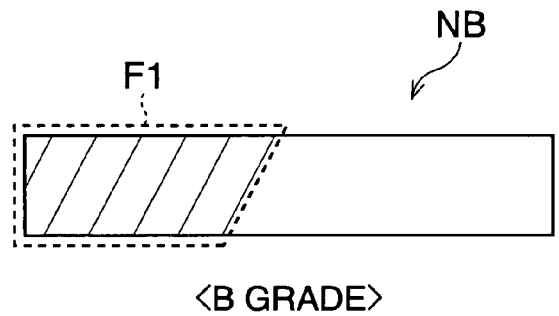
Figure 7C:
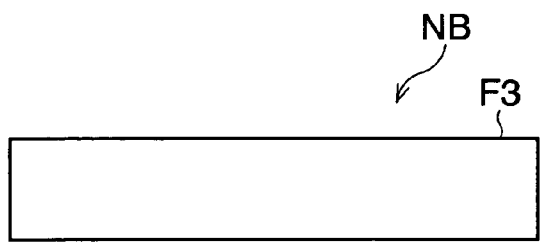
Figure 7D:
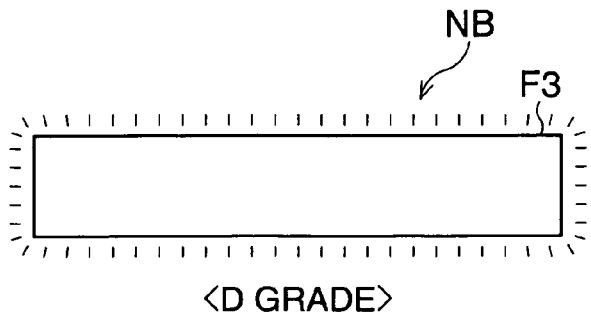
Figure 8:
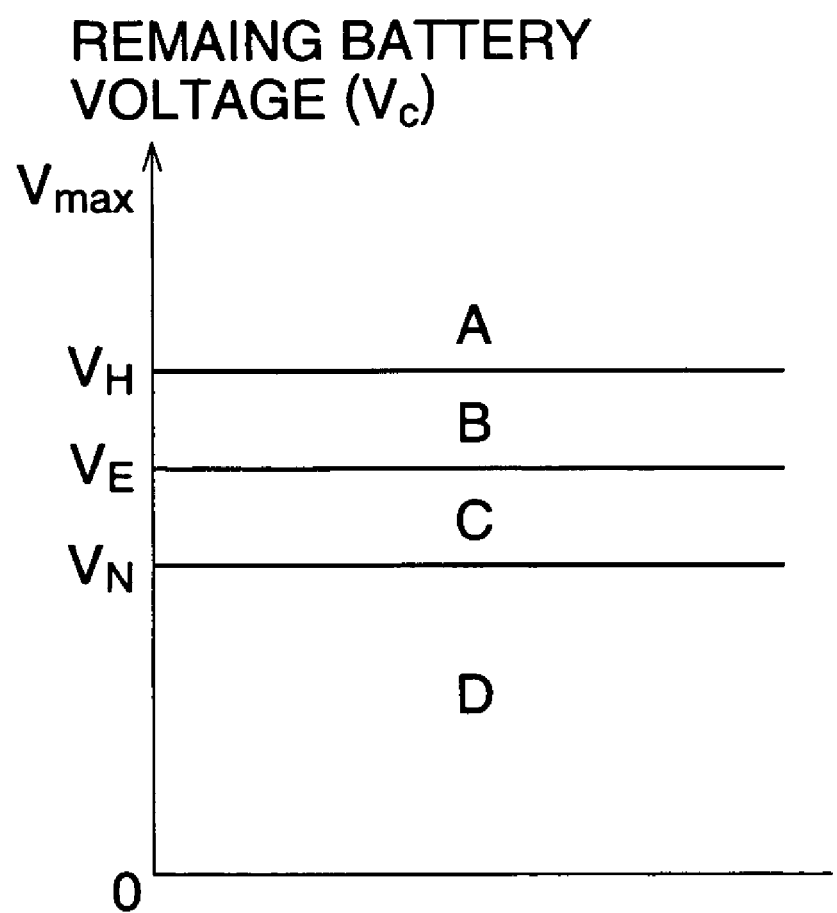
FIG. 8 is a view showing a range of a remaining battery voltage in each grade.

FIG. 6 is a view showing a subroutine of Step S212 in FIG. 5. FIGS. 7A to 7D are views showing an indicator mark corresponding to each grade. FIG. 8 is a view showing a range of the remaining battery voltage "$V_C$" in each grade.

As shown in FIG. 8, a total range of the remaining battery level is divided into four grades, or four stages "A" "B" "C", and "D". Herein, the range from the maximum voltage "$V_{max}$" to a half voltage "$V_H$" indicating the half battery-level is set to "A grade", the range from the half voltage "$V_H$" to a small voltage "$V_E$" indicating a little voltage, which indicates a alight battery-level, is set to "B grade", the range from the small voltage "$V_E$" to a limited voltage "$V_N$" indicating the necessity for the battery-exchange is set to "C grade", and the range equal to or less than the limited voltage "$V_N$", is set to "D grade".

As shown in FIGS. 7A to 7D, while the camera 10 is used, a remaining battery-level mark NB is displayed on the LCD 52 in accordance with the four grades A to D shown in FIG. 6. The remaining battery-level mark "NB" is constructed of three parts F1, F2, and F3. The part F3 represents a frame, the part F1 represents a rectangular-area with hatched-lines, which is the half of the area in the part F3, and the part F2 represents the remaining rectangular-area.

The Four types of indicator mark are prepared and one type is selectively displayed. When the remaining battery voltage "$V_C$" is in the "A" grade, the parts F1 to F3 are displayed on the LCD 52, whereas, when the remaining battery voltage "$V_C$" is in the "B" stage, the parts F1 and F3 are displayed on the LCD 52. When the remaining battery voltage "$V_C$" is in the "C" grade, only the mark F3 is displayed on the LCD 52. Then, when the remaining battery voltage "$V_C$" is in the "D" grade, the mark F3 is displayed while blinking. Note, when the electric power cannot be supplied to the camera due to any reason and the photograph motion cannot be performed, the remaining battery-level mark NB corresponding to the "D" grade shown in FIG. 7D is displayed. Also, when using the commercial electric power, the remaining battery-level mark NB is not displayed.

In Step S301 shown in FIG. 6, it is determined whether the remaining battery voltage "$V_C$" is equal to or less than the limited voltage "$V_N$". When it is determined that the remaining battery voltage "$V_C$" is equal to or less than the limited voltage "$V_N$", the process goes to Step S302, wherein a flag for displaying the remaining battery level-mark NB. corresponding to the "D" grade, is set.

On the other hand, when it is determined that the remaining battery voltage "$V_C$" is not equal to or less than the limited voltage "$V_N$" in Step S301, the process goes to Step S303, wherein it is determined whether the remaining battery voltage "$V_C$" is equal to or less than the small voltage "$V_E$". When it is determined that the remaining battery voltage "$V_C$" is equal to or less than the small voltage "$V_E$", the process goes to Step S304, wherein a flag for displaying the remaining battery level mark NB, corresponding to the "C" grade, is set.

On the other hand, when it is determined that the remaining battery voltage "$V_C$" is not equal to or less than the small voltage "$V_E$" in Step S303, the process goes to Step S305, wherein it is determined whether the remaining battery voltage "$V_C$", is equal to or less than the half voltage "$V_H$". When it is determined that the remaining battery voltage "$V_C$" is equal to or less than the half voltage "$V_H$", the process goes to Step S306, wherein a flag for displaying the remaining battery level mark NB, corresponding to the "B" grade, is set. On the other hand, when it is determined that the remaining battery voltage "$V_C$" is not equal to or less than the half voltage "$V_H$", the process goes to Step S307, wherein a flag for displaying the remaining battery level mark NB, corresponding to the "A" grade, is set.

After step S307 is performed, the indicator mark setting process of subroutine is terminated. When Step S209 or S212 in FIG. 5 is performed, the process returns to Step S103 in FIG. 4.

In Step S103, it is determined whether the operation for turning the electric power source OFF has been performed by the user. When it is determined that the operation for turning the electric power source OFF has been performed, the process goes to Step S104, wherein the process for turning the power OFF is performed. On the other hand, when it is determined that the operation for turning the electric power source OFF has not yet been performed, the process goes to Step S105, wherein the power source check process is performed.

Figure 9:
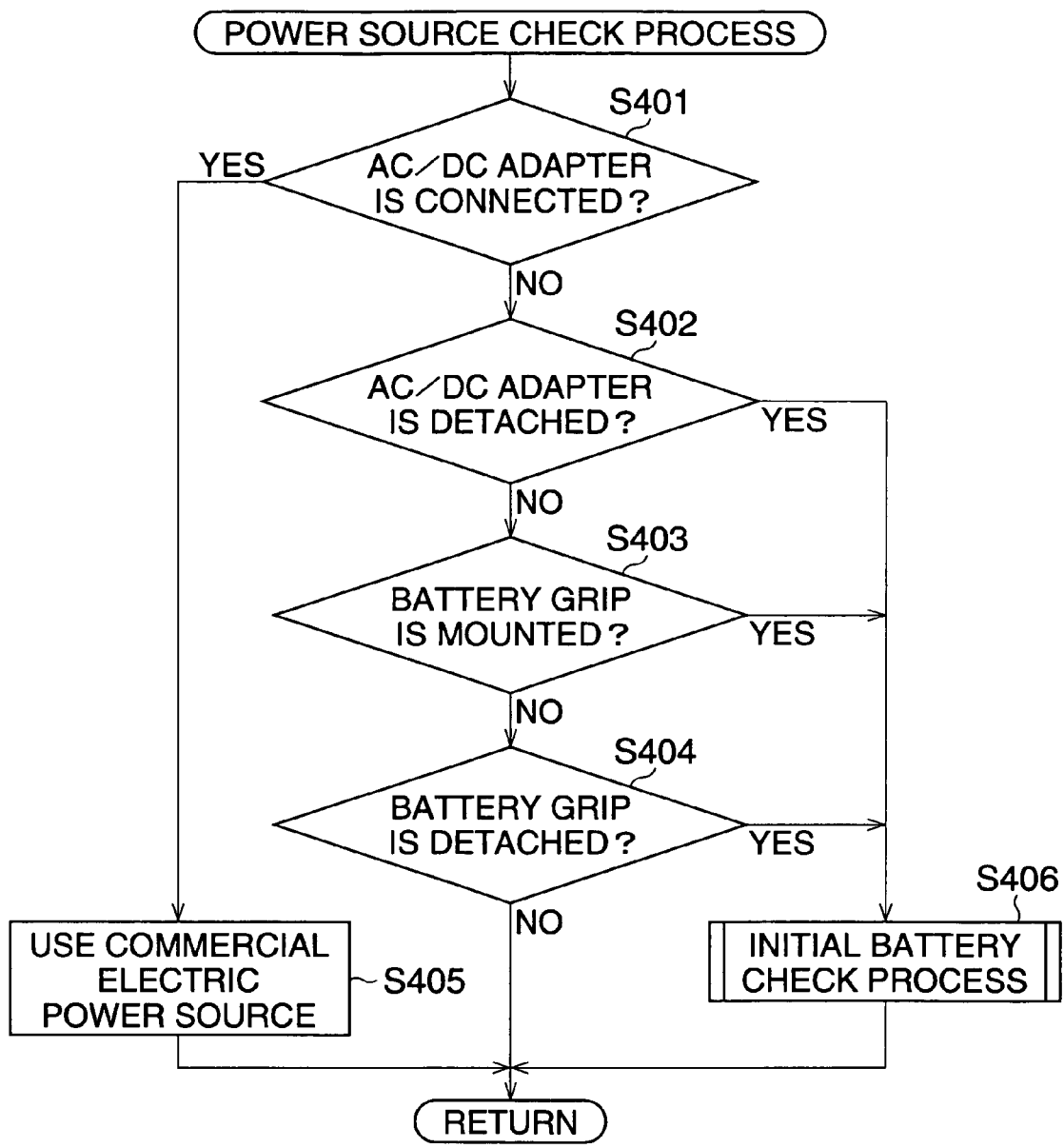
FIG. 9 is a view showing a subroutine of Step S105 in FIG. 4.

FIG. 9 is a view showing a subroutine of Step S105 in FIG. 4.

In Step S401, it is determined whether the AC/DC adapter 25 is connected to the camera 10, to use the outside commercial electric power. When it is determined that the AC/DC adapter 25 is connected to the camera 10, the process goes to Step S405, wherein a control signal for using the commercial electric power is output to the electric power source circuit 14. On the other hand, when it is determined that the AC/DC adapter 25 is not connected to the camera 10, the process goes to Step S402.

In Step S402, it is determined whether the AC/DC adapter is detached from the camera 10 when using the commercial electric power. When it is determined that the AC/DC adapter is detached from the camera 10 when using the commercial electric power, the process goes to Step S406, wherein the initial battery check process shown in FIGS. 5 and 6 is performed. On the other hand, when it is determined that the AC/DC adapter is not detached from the camera 10 when using the commercial electric power, the process goes to Step S403, wherein it is determined whether the battery grip 11 is mounted on the camera 10.

When it is determined that the battery grip 11 is mounted on the camera 10, the process goes to Step S406, wherein the initial battery check process is performed. Namely, the battery-check is performed for both batteries 23A and 23B since the electric power supply situation is changed. On the other hand, when it is determined that the battery grip 11 is not mounted on the camera 10, the process goes to Step S404, wherein it is determined whether the battery grip 11 is detached form the camera 10, when using the battery 23B. When it is determined that the battery grip 11 is detached form the camera 10 when using the battery 23B, the process goes to Step S406, wherein the initial battery check process is performed since the electric power supply situation is changed. On the other hand, when it is determined that the battery grip 11 is not detached form the camera 10 when using the battery the subroutine is terminated. Also, after Step S405 or S406 is performed, the process returns to Step S106 in FIG. 4.

In Step S106, the remaining battery-level mark NB is displayed on the LCD 52 on the basis of the flag, which is set by Step S302, S304, S306, or S307 in FIG. 6. Namely, one type of indicator mark NB, which corresponds to the selected grade encompassing the detected remaining voltage "$V_C$", is selected from the four types of indicator marks shown in FIGS. 7A to 7D.

In Step S107, it is determined whether the metering switch S2 is tuned ON by depressing the release button 19 halfway. When it is determined that the metering switch S2 is tuned ON, the process goes to Step S108, wherein the battery check process is performed. The battery check process is a process that changes the type of the indicator mark (the remaining battery-level mark) NB in accordance with the decrease of the detected remaining battery voltage "$V_C$".

Figure 10:
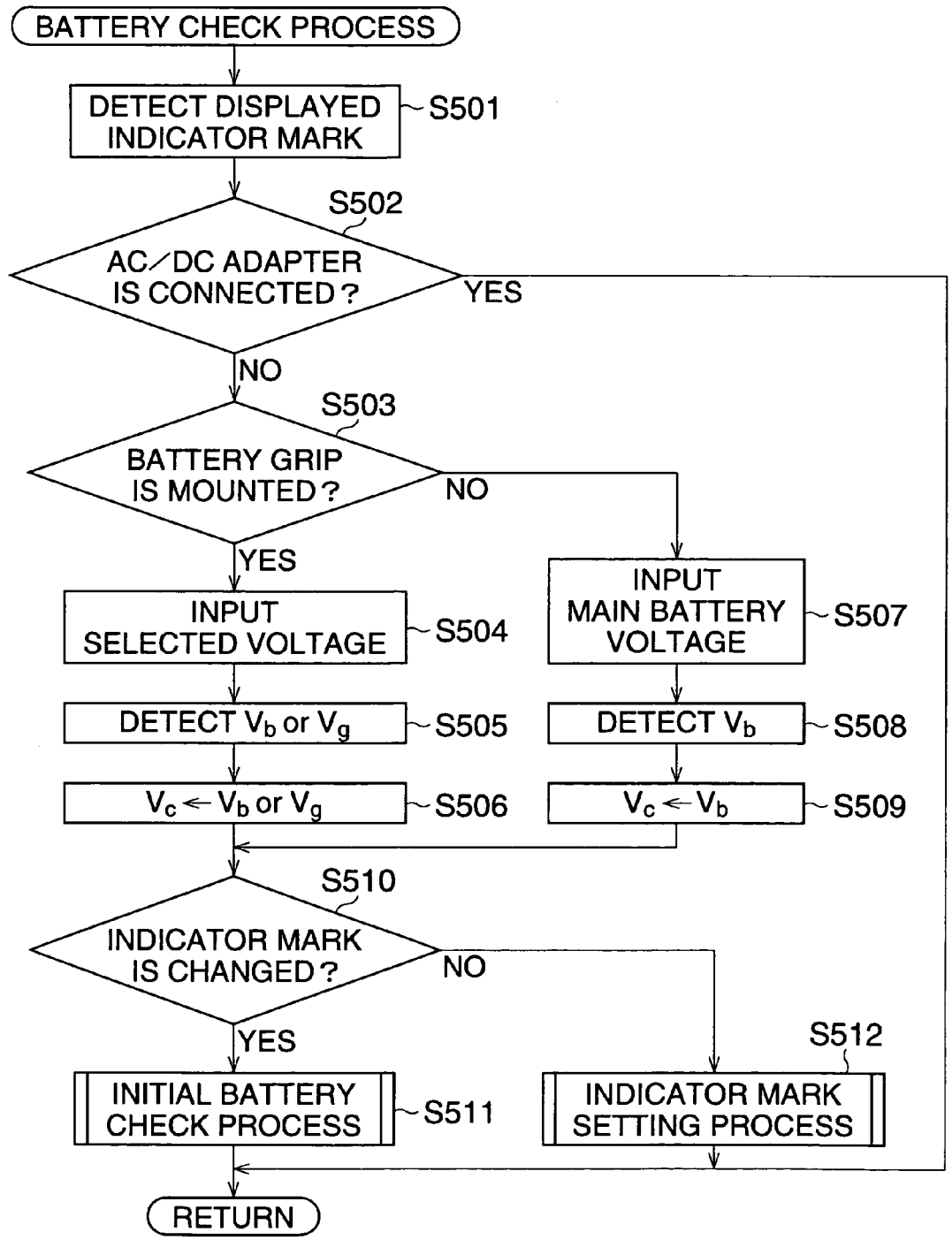
FIG. 10 is a view showing a subroutine of Step S108 in FIG. 4.

FIG. 10 is a view showing a subroutine of Step S108 in FIG. 4.

In Step S501, the flag, which has been set in Step S302, S304, S306, or S307, is read or extracted from the RAM 43 temporarily. Namely, the type of the indicator mark NB displayed on the LCD is detected. In Step S502, it is determined whether the AC/DC adapter 25 is connected to the camera 10. When it is determined that the AC/DC adapter 25 is connected to the camera 10, the process is directly terminated. On the other hand, when it is determined that the AC/DC adapter 25 is not connected to the camera 10, the process goes to Step S503, wherein it is determined whether the battery grip 11 is mounted on the camera 10.

When it is determined that the battery grip 11 is not mounted on the camera 10 in Step S503, the process goes to Step S507, a control signal is output to the electric power source circuit 14 so as to input the voltage of the battery 23A to the electric power source circuit 14. Then, in Step S508, the present voltage "$V_b$" of the battery 23A is detected. In Step S509, the detected voltage "$V_b$" is set to the remaining battery voltage "$V_C$". After Step S509 is performed, the process goes to Step S510.

On the other and, when it is determined that the battery grip 11 is mounted on the camera 10, the process goes to Step S504. In Step S504, a control signal is output to the electric power source circuit 14 so as to allow the electric power source circuit 14 to detect the voltage of the selected battery in Step S207 and S210 shown in FIG. 5. In Step S505, the present voltage, namely the voltage "$V_b$" of the battery 23A or the voltage "$V_g$" of the battery 23B is detected. In Step S506, the detected voltage $V_b/V_g$ is set to the remaining voltage "$V_C$". While the type of the indicator mark NB is not changed, the battery-check is performed on only the selected and used battery. After Step S506 is performed, the process goes to Step S510.

In Step S510, it is determined whether the type of the remaining battery level mark NB, corresponding to the remaining voltage "$V_C$" set by Step S506 or S509, coincides with the type of the remaining battery level mark NB corresponding to the flag extracted by Step S501. Namely, it is determined whether the type of the indicator mark NB should be changed since the remaining battery voltage "$V_C$" shifts from the "A" grade to "B" grade, "B" grade to "C" grade, or "C" grade to "D" grade due to the exhaustion of the used battery.

When it is determined that the type of the indicator mark NB should be changed since the remaining battery voltage "$V_C$" shifts over a boundary voltage, which is positioned at boundary level between the adjacent grades, the process goes to Step S511, wherein the initial battery check process shown in FIG. 5 is performed. Namely, the battery check is performed for the batteries 23A and 23B, and one battery, the remaining battery voltage of which is more than the other battery, is selected. On the other hand, when it is determined that the type of indicator mark NB should be maintained since the remaining battery voltage has not shifted to the boundary voltage, the process goes to Step S512, wherein the battery check is not performed, instead the indicator mark setting process shown in FIG. 6 is performed. After Step S511 or S512 is performed, the process goes to Step S109 in FIG. 4.

In Step S109, it is determined whether the photograph motion is impossible as the remaining battery voltage "$V_C$" is in the D grade. When it is determined that the photograph motion is impossible, the process returns to Step S105. On the other hand, when it is determined that the photograph motion is possible, the process goes to Step S110, wherein the photograph motion is performed.

Figure 11:
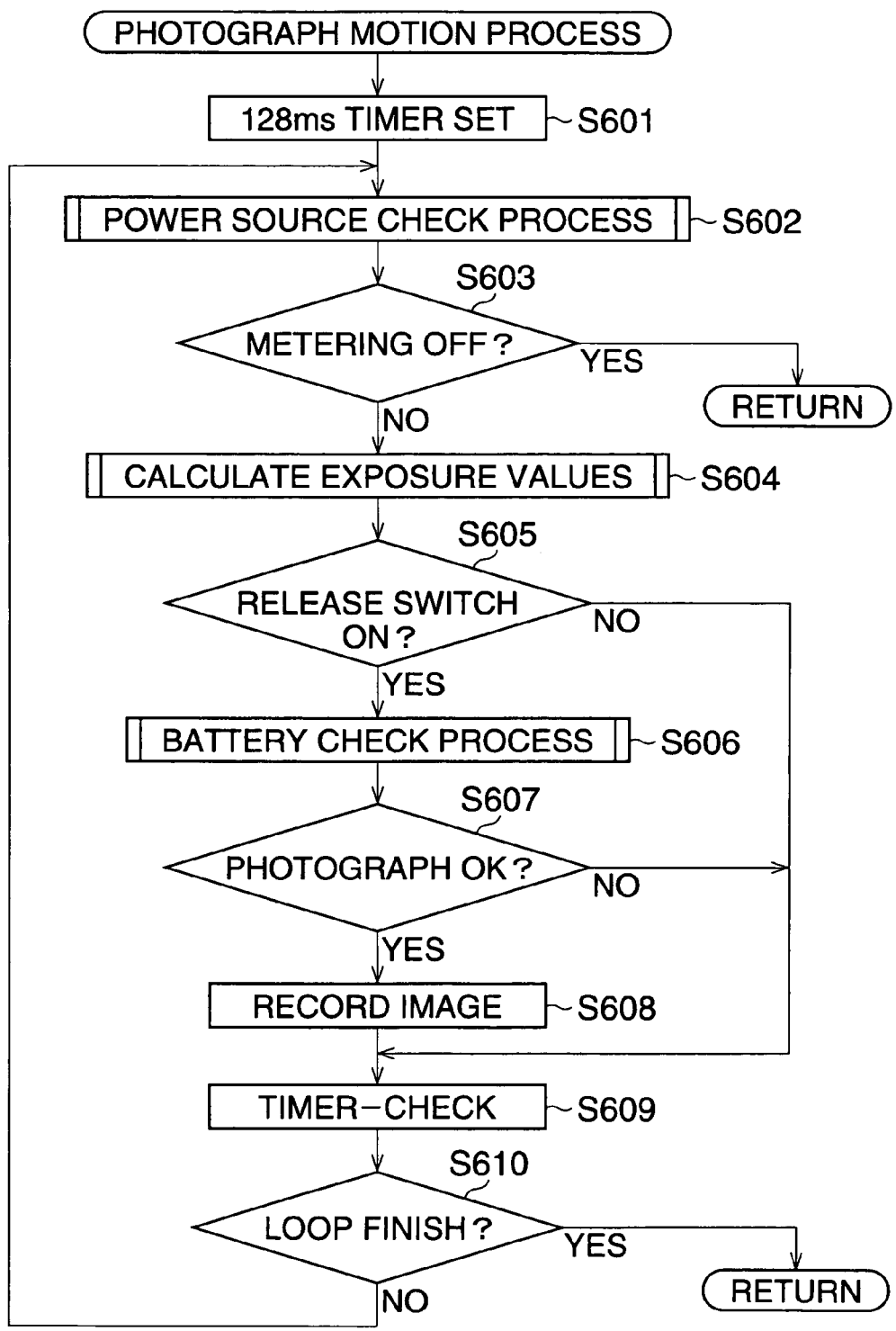
FIG. 11 is a view showing a subroutine of Step S110 in FIG. 4.

FIG. 11 is a view showing a subroutine of Step S110 in FIG. 4.

In Step S601, a time count process starts to measure a loop-interval of the photograph motion. Herein, timer-interval, which is a multiple of 128 [ms], is checked as a loop-interval. In Step S602, the power source check process shown in FIG. 9 is performed. In Step S603, it is determined whether the release button 19 cannot be depressed fully, for any reason. When it is determined that the release button 19 cannot be depressed fully, the process is terminated. On the other hand, when it is determined that the release button 19 can be depressed fully, the process goes to Step S604.

In Step S604, exposure values such as shutter speed and F. number are calculated on the basis of the detected brightness of the subject, and the lens is driven to focus the subject. In Step S605, it is determined whether the release switch S3 is tuned ON by depressing the release button 19 fully. When it is determined that the release switch S3 is tuned ON, the process skips to Step S609. On the other hand, when it is determined that the release switch S3 is not tuned ON, the process goes to Step S606, wherein the battery check process shown in FIG. 10 is performed. In Step S607, it is determined whether the photograph motion cannot be performed since the remaining battery voltage "$V_C$" is small. When it is determined that the photograph motion cannot be performed, the process skips to Step S609. On the other hand, when it is determined that the photograph motion can be performed, the process goes to Step S608, the photograph motion is performed to record the subject image.

In Step S609, the time is counted to check time-interval. In Step S610, it is determined whether the photograph motion process should be terminated after passing the time-interval. When it is determined that the time has not passed the time-interval, the process returns to Step S602. On the other hand, when it is determined that the photograph motion process should be terminated, the photograph motion process is terminated.

In this way, in this embodiment, one of the battery 23A in the camera body 10B and the battery 23B in the battery grip 11 is selectively used, namely, the battery, which has a greater remaining voltage compared to that of the other, is used. On the other hand, one of the four types of indicator marks NB is displayed on the LCD 52. When the remaining battery voltage shifts over the boundary voltage level "$V_H$" "$V_E$" or "$V_N$", the remaining voltages of the batteries 23A and 23B are checked, the battery having a greater remaining voltage is selected and used. Thus, the total remaining battery-level of the batteries 23A and 23B is displayed by the four types of indicator mark NB, and the indicator mark NB is displayed step by step.

The number of batteries may be set to three or another number. The number of indicator mark types may be different to the number in the above embodiment. The electric power supply control described above may be applied to mobile equipment with a main battery and an auxiliary battery, such a cellar-phone, PDA, and so on. Further, The electric power supply control described above may be applied to mobile equipment with plural batteries (for example, three or four batteries).

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2004-177990 (filed on Jun. 16, 2004), which is expressly incorporated herein, by reference, in its entirety.

The invention claimed is:

1. A camera system comprising:
a camera body, a first battery which supplies electric power to the camera system being installed in said camera body;
an auxiliary electric power source accessory that is detachably mounted on said camera body, a second battery which supplies electric power to the camera system being installed in said auxiliary electric power source accessory;
a battery checker that checks a remaining battery-level of at least one of said first and second batteries;
a battery-level indicator that indicates a mark representing one of a plurality of remaining battery-level grades; and
a battery selector that selects one of said first and second batteries to supply electric power to the camera system in response to a change of a remaining battery-level grade of a battery in use, the remaining battery-level of the selected battery being greater than the remaining battery-level of the other battery.

2. The camera system of claim 1, further comprising an electric power source situation detector that detects whether an electric power supply situation has changed,
wherein said battery checker checks the remaining battery-level of said first and second batteries when the electric power supply situation has changed.

3. The camera system of claim 1, wherein the battery checker checks only a battery in use while its remaining battery-level grade has not changed, and checks the first and second batteries when the remaining battery-level grade has changed.

4. The camera system of claim 1, wherein the battery-level indicator indicates four discrete remaining battery-level grades.

5. A camera comprising:
a camera body, a first battery which supplies electric power to the camera being installed in said camera body, an auxiliary electric power source accessory, in which a second battery which supplies electric power to the camera is included, being detachably mounted on said camera body;
a battery checker that checks a remaining battery-level of at least one of said first and second batteries;
a battery-level indicator that indicates a mark representing one of a plurality of remaining battery-level grades; and
a battery selector that selects one of said first and second batteries to supply electric power to the camera in response to a change of a remaining battery-level grade of a battery in use, the remaining battery-level of the selected battery being greater than the remaining battery-level of the other battery.

6. An apparatus for controlling the supply of electric power to mobile equipment, comprising:
a battery checker that checks a remaining battery-level of at least one of a plurality of batteries including a main battery which supplies electric power to the mobile equipment and is installed in a body, and at least one other battery which supplies electric power to the mobile equipment and is installed in an auxiliary electric power source accessory that is detachably mounted on said body;
a battery-level indicator that indicates a mark representing one of a plurality of remaining battery-level grades; and
a battery selector that selects one of said plurality of batteries to supply electric power to the mobile equipment in response to a change of a remaining battery-level grade of a battery in use, the remaining battery-level of the selected battery being greater than the remaining battery-levels of the other batteries.

7. The camera system of claim 1, wherein the battery checker determines that a remaining battery-level grade has changed by comparing a remaining battery-level with a voltage level corresponding to a mark indicated by the battery-level indicator, and the battery selector performs the battery selection based on the determination by the battery checker.

8. The camera of claim 5, wherein the battery checker determines that a remaining battery-level grade has changed by comparing a remaining battery-level with a voltage level corresponding to a mark indicated by the battery-level indicator, and the battery selector performs the battery selection based on the determination by the battery checker.

9. The apparatus of claim 6, wherein the battery checker determines that a remaining battery-level grade has changed by comparing a remaining battery-level with a voltage level corresponding to a mark indicated by the battery-level indicator, and the battery selector performs the battery selection based on the determination by the battery checker.

* * * * *